April 29, 1952 O. KORNEI 2,594,934
ERASING HEAD FOR MAGNETIC RECORD MEMBERS
Filed Jan. 20, 1950 2 SHEETS—SHEET 1
FIG. I
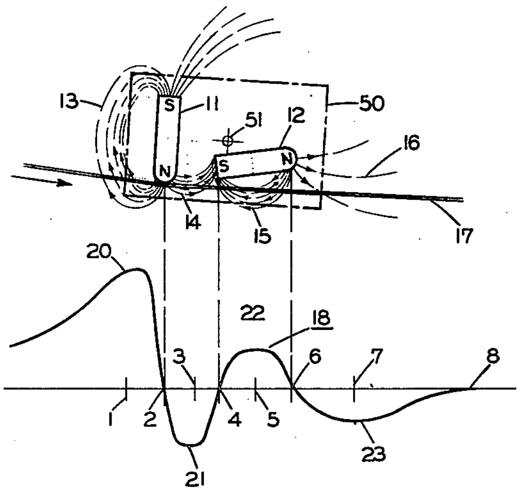
FIG. 2
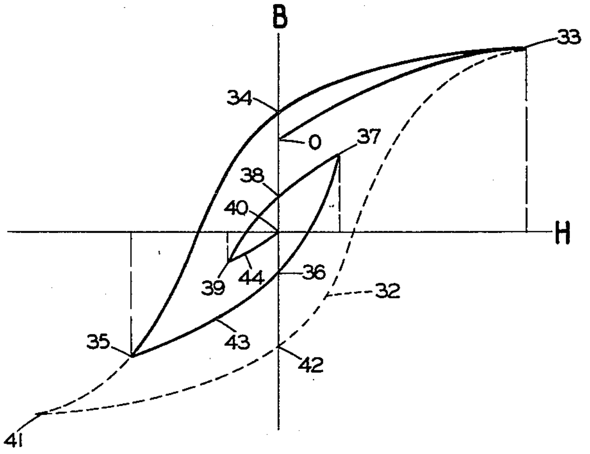
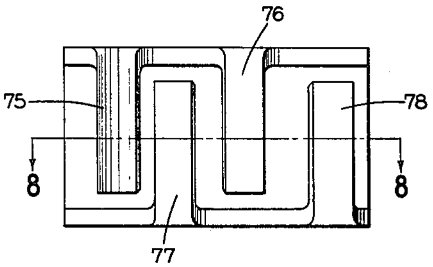
FIG 7
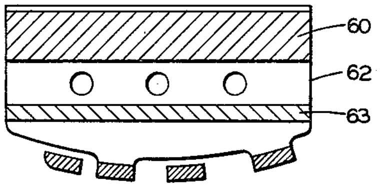
FIG. 8
INVENTOR.
OTTO KORNEI
BY
Elmer J. Hyde
ATTORNEY INVENTOR.
OTTO KORNEI
BY
Elber J. Hyde
ATTORNEY Patented Apr. 29, 1952 2,594,934

UNITED STATES PATENT OFFICE 2,594,934

ERASING HEAD FOR MAGNETIC RECORD MEMBERS

Otto Kornei, Cleveland Heights, Ohio, assignor to The Brush Development Company, Cleveland, Ohio, a corporation of Ohio.

Application January 20, 1950, Serial No. 139,759

6 Claims. (Cl. 179—100.2)

This invention relates to an erasing head for erasing a magnetic record member.

This application is a continuation-in-part of application Serial No. 784,563, filed November 7, 1947, now Patent No. 2,535,498, granted December 26, 1950, in the name of Otto Kornei, for Magnetic Recording Apparatus.

An object of the present invention is to provide an inexpensive erase head utilizing a magnet which generates a unidirectional field for substantially neutralizing a magnetic record member.

A further object of the present invention is to provide an erase head utilizing a magnet which generates a unidirectional field for exerting high field strength on a magnetic record member and in which there is very small external leakage field.

A further object of the present invention is to provide an erase head utilizing a magnet which generates a unidirectional field wherein a large proportion of the available magnetic energy is utilized for saturating and then for neutralizing the magnetic record member.

A further object of the present invention is to provide an erase head wherein one magnet which generates a unidirectional field establishes a plurality of fields of opposite polarity for substantially neutralizing a record member.

Still another object of the present invention is to provide an easily adjustable erase head.

For a better understanding of the present invention, together with other and further objects thereof, reference is had to the following description taken in connection with the accompanying drawings, and its scope will be pointed out in the appended claims.

In the drawings:

Fig. 1 is a diagrammatic showing of the flux fields adjacent a permanent magnet erase head;

Fig. 2 is a diagrammatic explanation of the erasing action of the apparatus of Fig. 1;

Fig. 7 is a front view of a modified erase head; and

Fig. 8 is a sectional view taken along line 8—8 of Fig. 7.

Figure 4:
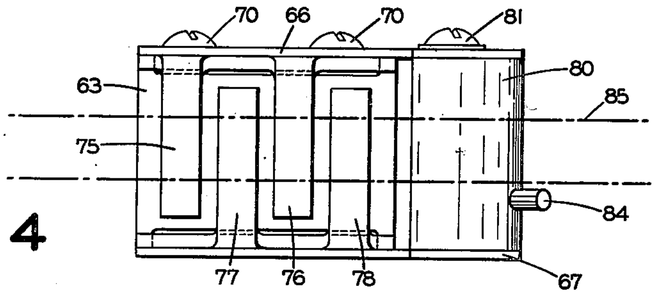
Fig. 4 is a top view of the erase head of Fig. 3.

One aspect of the invention is an erasing head for a magnetic record member comprising at least three spaced apart intermeshed teeth and a single source of magnetization common to all of the teeth oppositely polarizing adjacent teeth.

Another aspect of the present invention is an erasing head for a magnetic record member which in its erasing operation saturates the magnetic record member and then, by a number of reversals of the magnetic field action on the record member, returns the record member to a substantially neutral magnetic state. The erasing head of this invention is comprised of a plate-shaped permanent magnet which has a north pole and a south pole. A first magnetizable plate is secured to the magnet in engagement with one pole area thereof and a second magnetizable plate is secured to the magnet in engagement with the other pole area. A set of substantially parallel spaced-apart magnetizable teeth are connected to the first of these magnetizable plates, and a magnetizable tooth is connected to the second of these plates. The magnetizable tooth is substantially parallel to and is positioned between the two teeth of the set, and it is separated from the said two teeth. Details of this construction and a detailed description of its operation are presented in further detail in connection with the descriptions of Figs. 3 to 8 inclusive.

Fig. 1 diagrammatically indicates the operation of a permanent magnet type erasing head. In the upper portion of Fig. 1, the magnets 11 and 12 together with their flux fields 13, 14, 15, 16 and the passing record member 17 are schematically shown, the lower portion being a graphical representation including the curve 18 of the horizontal components of the respective field intensities impressed on the successive elements of the record member 17 in various positions of the guide path shown in the upper portion. As a track element moves through point 1 of the guide path, a relatively intense magnetic field is impressed upon it in one direction longitudinally along the track. The maximum intensity of the magnetic field is indicated by the peak 20 of the lower curve and is of a magnitude equal to or exceeding that of any previous magnetization of the record track elements, and preferably in the range of saturation. At point 2, the magnetic field is reversed in direction, the field 14 being opposite to field 13, as shown by the arrowheads applied to the flux lines in the upper portion of the figure. Point 3 represents the maximum zone of the field 14 to which the record track elements are exposed, this amplitude being indicated by the minimum region 21 of the curve 18. At zone 4, the magnetic field is again reversed, and the track elements being to become exposed to the flux field 15, the greatest amplitude of which is shown at point 22 of curve 18, corresponding to location 5. Another field direction reversal takes place at point 6 followed by a second minimum region 7 indicated by zone 23 of curve 18. Further movement along the record track guide path brings the track elements into gradually diminishing regions of field 16, the intensity variation being shown in curve 18 between points 7 and 8. As can be seen in curve 18, the track elements, upon reaching position 4, have completed exposure to an entire cycle of magnetic field reversal and leave the field of the magnetic head at about point 8 (strictly speaking, at infinity) after being subjected to a second complete cycle. The successive horizontal field intensities indicated by the maxima and minima 20, 21, 22 and 23 are of progressively decreasing strengths.

The result of the above magnetic treatment is graphically illustrated in Fig. 2, which shows a hysteresis loop 32 of the individual record track elements. The loop is drawn with the horizontal axis indicating the magnetizing forces H to which the elements are exposed, and the vertical axis indicating the induction B induced in the elements upon exposure to such fields. As the track element approaches the erasing head, it might exhibit a longitudinal induction corresponding to the point 0 on the B-axis. The effect of the large field intensity 20 at point 1 is to bring the track element to point 33 of the hysteresis loop, which point preferably is at or above the saturation value to insure uniform magnetization no matter what the previous history of the track elements may have been. Thus, even if the element were exposed to field intensity 20 with a previously obtained flux density ranging anywhere between the points 34 and 42 corresponding to maximum induction in either longitudinal direction, it will always be brought to point 33 on the hysteresis loop. As the track element moves from the maximum 20 in one field direction to a maximum 21 in the opposite field direction, it is carried along the upper branch of hysteresis loop 32, from point 33 through point 34 corresponding to point 2 of curve 18, and brought to point 35 of the hysteresis loop. Because the intensity of field 14 in the guide path is less than that of field 13, as shown by the relative amplitudes of points 21 and 20 on curve 18, the reversed magnetization at point 35 is lower than the reversed saturation point 41.

From point 35 the track element is carried into the reversed field 15 along the minor hysteresis loop 43 through point 36 corresponding to zone 4 of Fig. 1 and to point 37 at the maximum intensity region 5, corresponding to the field intensity 22. The track element is now beginning its second cycle of reversing magnetization. From here, the track element is brought through point 38 corresponding to zone 6 of Fig. 1 to point 39 along a still lesser hysteresis loop exposed to the maximum intensity of field 16 as indicated at 23. The exit from field 16 brings the track element back to the zero field axis B along the small hysteresis loop 44 approximately to the point where it exhibits no residual induction, as indicated at 40.

Due to the variations among individual erasing heads and the magnetic properties of different record members, the operation of the head may not bring the track elements exactly to point 40 of Fig. 2 corresponding to the intersection of the B and H axes. When this is the case, a small amount of residual background noise appears in the record track after the completion of the erasing process.

These variations are compensated, according to a feature of the invention, by making a final adjustment of the erasing head support 50 by rotating it about its pivotal axis 51 until the residual noise of the record track is at a minimum. The effect of the adjusting rotation is that of raising or lowering residual point 40 along the B-axis by a small amount.

The above description has been confined to the horizontal or longitudinal components of the magnetic fields to which the track elements are exposed. Inasmuch as most magnetic recordings are essentially effected by longitudinal magnetization of the track elements, any perpendicular magnetic flux exhibited by the track elements is of minor consideration. However, the erasing heads of the invention, such as head 50 of Fig. 1 or the head of Fig. 3, also exhibit a succession of perpendicularly directed fields whose maxima correspond approximately to the zero points of the longitudinal field components. At these locations magnetic flux is directed generally perpendicular to the record track guide path. The arrangement of Fig. 1 is also effective for substantially removing any perpendicular component of magnetic flux from the record track elements in a manner similar to that shown for the longitudinal components. The combined result is a highly effective magnetic erasing head of very simple construction.

The erasing head 50 has an appreciable amount of leakage flux which may interfere with other elements of a magnetic recorder-reproducer device. For example, the flux field may adversely affect the reproducing head. The high leakage flux also results in a very uneconomical use of the available magnetic energy. It is highly desirable, then, that this leakage flux be reduced to a minimum. It is also highly desirable to utilize only one permanent magnet as the permanent magnet is the expensive part of such an erasing head. Another requisite for an erasing head utilizing a magnet which generates a unidirectional field is to saturate each incremental portion of the record member as the portion passes the head.

The erasing head of Figs. 3 to 8 inclusive is outstanding in that, with a single small magnet, saturation of the record medium is obtained yet the leakage flux is kept to a minimum, and the head also establishes a plurality of field reversals in the record member leaving it in a substantially demagnetized condition.

Figures 3, 5, 6:
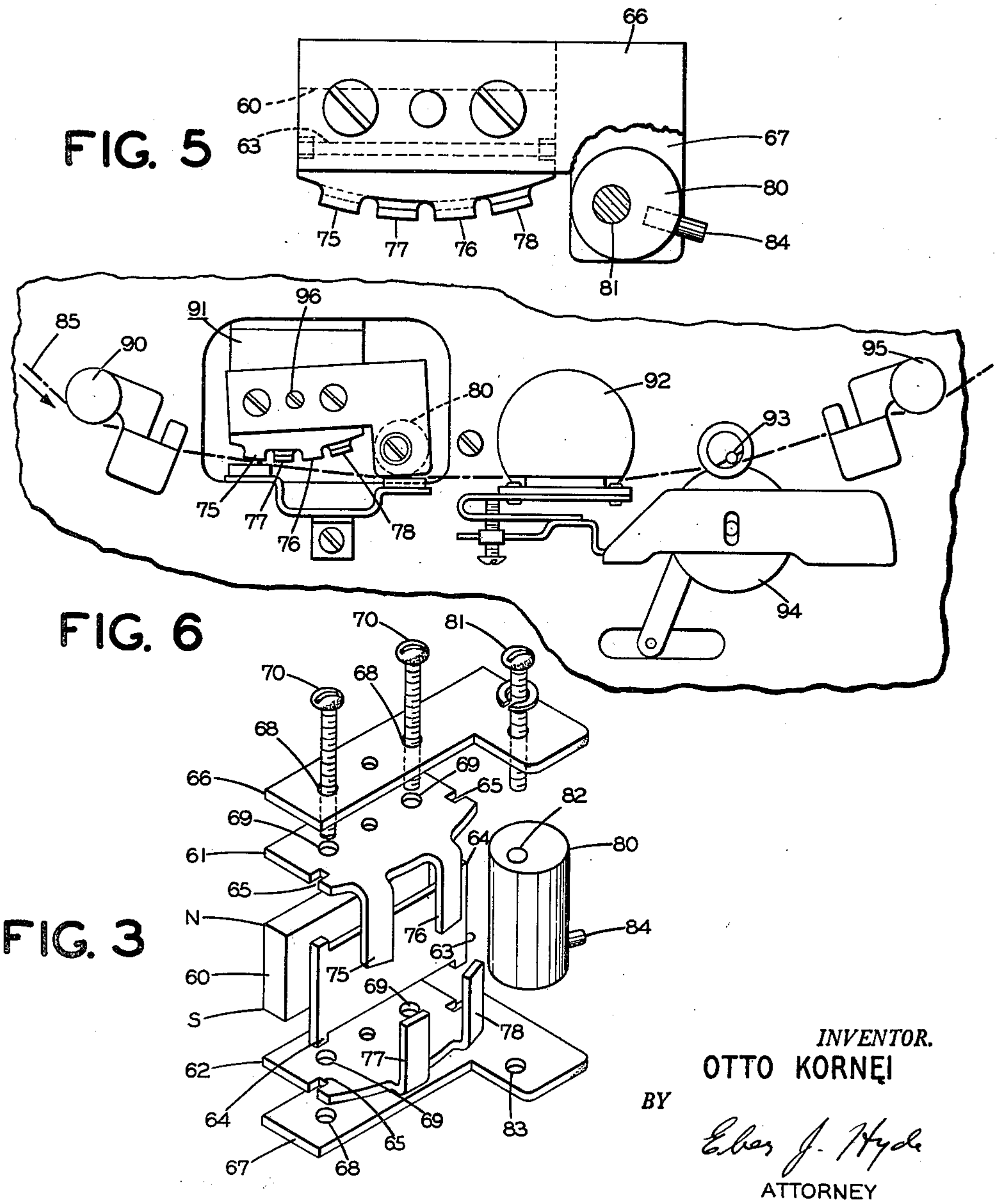
Fig. 3 is a front view of the permanent magnet erase head of the present invention.
Fig. 5 is a top view of a portion of a magnetic recorder-reproducer device showing the erase head of Figs. 3 and 4 mounted for operation.
Fig. 6 is an exploded isometric view of the erase head of Figs. 3 and 4.

Fig. 3 shows in detail the construction of the erase head of this invention. It comprises a permanent magnet 60 having a north pole marked "N" in Fig. 3 and a south pole marked "S." Obviously these two poles may be reversed. The permanent magnet 60 preferably is plate-shaped. A first plate-shaped magnetizable member 61 is secured to the magnet 60 and is in engagement with the north pole area thereof. A second plate-shaped magnetizable member 62 is secured to the magnet 60 in engagement with the south pole area of the magnet. A non-magnetic spacer member 63 having four ears 64 extends in a direction substantially parallel to the plane of the magnet 60 and each of the four ears is adapted to fit into a notch 65 in one of the magnetizable plates 61, 62. A top mounting bracket 66, preferably of non-magnetic material, lies on top of the magnetizable plate 61; and a bottom mounting member 67, preferably of non-magnetic material, lies underneath magnetizable member 62. Holes 68 are provided through the top and bottom mounting members, and holes 69 are provided through the first and second magnetizable plates 61, 62 in alignment with the holes 68. Screws 70 extend down through the holes 68, 69 and thread into the holes 68 in the bottom mounting plate 67 for holding the entire assembly together. Preferably, the screws 70 extend in the space between the magnet 60 and the spacer 63. Thus the top mounting plate 66 and the first magnetizable plate 61 are clamped against the magnet 60 and the spacer 63. Similarly, the bottom mounting member 67 and the second magnetizable plate 62 are pulled up against the bottom of the magnet 61 and against the bottom of the non-magnetic spacer 63. The entire assembly is thus clamped together by the two screws 70 to form a single unitary erasing head structure.

A plurality of spaced apart magnetizable teeth 75, 76 are connected to the first magnetizable member 61. As shown in Fig. 3, they are integral with the member 61. However, it is within the scope of the invention that they be separate, detachable teeth. One or more magnetizable teeth 77, 78 are connected to the second of the magnetizable plates 62. As shown in Fig. 3, they may be integral with the plate 62, and it is within the scope of this invention that they be separate, detachable teeth. Teeth 75, 76 extend toward the magnetizable plate 62, and the teeth 77, 78 extend toward the magnetizable plate 61. Preferably, each of the plurality of teeth extend in a direction substantially parallel to the plane of the magnet 60. Tooth 77 is positioned between and is separated from teeth 75, 76, and the tooth 76 is positioned between and separated from teeth 77, 78. Each of the teeth 75, 76 is a north magnetic pole and each of the teeth 77, 78 is a south magnetic pole. Thus magnetic fields of opposite directions will be set up between adjacent edges of successive teeth.

A record track guide and adjustment member 80 is secured between the upper and lower mounting plates 66, 67 by means of the screw 81 which extends through a hole in the upper plate 66, through an eccentric hole 82 in the tape guide member 80 and into threaded engagement with the hole 83 in the lower mounting plate 67. A record member guide arm 84 extends outwardly from the guide member 80 for engagement with one edge of the record member as it moves past the erasing head. The guide member 80 determines the distance between the record member and the teeth 77, 76 and 78, and the guide arm 84 substantially positions the record member in the center of the erasing head as is shown in Fig. 4 wherein the record member is indicated as a tape identified by reference character 85.

The primary purpose of the guide and adjustment member 80 is to adjust the position of the record member with respect to the erasing head. This adjustment may be seen by referring to Fig. 6 wherein there is shown, in a top view, a portion of a magnetic recorder-reproducer device. The path 85 of the record member is shown by the dash-dot line, and the record member moves in the direction of the arrow past the guide post 90, past the erase mechanism shown generally by reference character 91, past the record-reproduce head 92, between the drive spindle 93 and the pinch roller 94, and then past the guide post 95. The record member preferably engages the first two teeth 75, 77 of the erase head bridging the gap therebetween where it is saturated. From this location on in the direction of the motion of the record member the subsequent teeth of the erase head recede from the record member. Thus, by being positioned farther away from the successive gaps between the teeth of the erase head, the amplitude of the flux in each incremental portion of the record member as it moves past the head is gradually decreased as it is reversed until, as was explained in connection with Figs. 1 and 2, the resultant flux in the record member is substantially zero.

In order to adjust the flux fields operating on the record member as the record member leaves the erase head 91, the adjustment member 80 is eccentrically mounted on the screw 81. By rotating the adjustment member 80, the position of the record member with respect to the erasing teeth 76, 78 is changed slightly and this change varies the field operating on each incremental portion of the record member as it leaves the erase head 91. Thus the guide and adjustment member 80 is utilized for the fine adjustment of the erase head. Coarse adjustment of the erase head is obtained by pivoting the entire head 91 about the screw 96 in order to adjust the position of the head 91 with respect to the recorder-reproducer.

Figs. 7 and 8 show a modification of the erase head wherein the spacing between successive teeth progressively increases in the direction of motion of the record member past the erase head. When utilizing a head of the structure shown in Figs. 7 and 8, it is not as essential that the record member move away from the teeth as it passes over the head, although the final adjustment for the magnetic neutralization of the record member will, in general, have to be done by a variation of the spacing between the record member and the air gaps of the head. This is because the increased spacing between successive teeth reduces in itself the flux concentration in the record member as it moves past the teeth and an incremental portion of the record member will be saturated when it bridges the gap between the two first teeth. As that incremental portion bridges the gap between the second and third teeth, the field active on that portion is considerably less due to the wider spacing. As that incremental portion bridges the gap between the third and fourth teeth, the field is again considerably reduced. By proper spacing of the teeth, the field active on the incremental portion of the record member as it leaves the effective field of the erase head will return the record member substantially to its neutral magnetic condition.

While the description of this invention utilizes a permanent magnet it is to be understood that an electromagnet having a coil connected to a source of direct electric current may also be used, and that a unidirectional field is established by each of these two types of magnets.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a magnetic recorder-reproducer device: a support; a magnetizable record member mounted on said support; means to drive said record member along a fixed path; an erase head comprising at least three spaced apart intermeshed teeth, only a single source of magnetization common to all of said teeth oppositely polarizing adjacent teeth; means connecting said erase head to said support with the tooth at one end of said head sufficiently closely adjacent said record member to magnetically saturate each increment of said record member as each increment of the record member is driven past said tooth in a direction toward the other teeth, and with each successive tooth spaced further from said record member than the preceding tooth to provide alternating and gradually decreasing magnetic flux in each increment of the record member as each increment of the record member moves past said erase head.

2. A magnetic record transducer device as set forth in claim 1, further characterized by a guide member for engaging and guiding said record member, means connecting said guide member to said support at a location adjacent the last of said teeth past which each incremental portion of the record member moves for holding said record member spaced away from said last tooth.

3. A magnetic record transducer device as set forth in claim 2, further characterized in that said guide member comprises an adjustable eccentric member for adjusting the spacing between said record member and said last tooth.

4. A magnetic record transducer device as set forth in claim 2, further characterized in that said guide member comprises part of said erase head.

5. A magnetic record transducer device as set forth in claim 3, further characterized in that said guide member comprises part of said erase head.

6. In a magnetic recorder-reproducer device, an erase head comprised of at least three spaced apart intermeshed teeth and a single source of magnetization common to all of said teeth for oppositely polarizing adjacent teeth; a record member; and driving and guiding means for driving said record member past said erase head in a fixed guided path with said record member in engagement with only the first two of said spaced apart intermeshed teeth for magnetically saturating each incremental portion of the record member as it passes said two teeth, and with successive intermeshed teeth spaced farther from said record member.

OTTO KORNEI.

REFERENCES CITED

The following references are of record in the file of this patent:

UNITED STATES PATENTS

| Number | Name | Date |
|---|---|---|
| 949,351 | Clayton | Feb. 15, 1910 |
| 1,863,308 | Jones | June 14, 1932 |

FOREIGN PATENTS

| Number | Country | Date |
|---|---|---|
| 322,252 | Germany | June 24, 1920 |